United States Patent [19]
Mori et al.

[11] Patent Number: 5,574,269
[45] Date of Patent: Nov. 12, 1996

[54] PROCESSING SYSTEM FOR PROCESSING INFORMATION IN CARD HAVING PLURALITY OF FUNCTIONS

[75] Inventors: Seiji Mori; Kyoko Terada, both of Kawasaki, Japan

[73] Assignee: Fujitsu Limited, Kawasaki, Japan

[21] Appl. No.: 197,819

[22] Filed: Feb. 17, 1994

[30] Foreign Application Priority Data

Feb. 26, 1993 [JP] Japan ................................. 5-038585

[51] Int. Cl.⁶ ............................................. G06K 5/00
[52] U.S. Cl. ........................................ 235/380; 235/375
[58] Field of Search ................................. 235/380, 379, 235/375; 364/401, 405, 406, 408

[56] References Cited

U.S. PATENT DOCUMENTS

| | | | |
|---|---|---|---|
| 4,443,027 | 4/1984 | McNeely et al. | 283/83 |
| 4,656,342 | 4/1987 | Ugon | 235/379 |
| 4,700,055 | 10/1987 | Kashkashian, Jr. | 235/379 |
| 5,025,372 | 6/1991 | Burton et al. | 364/406 |
| 5,128,997 | 7/1992 | Pailles et al. | 380/23 |
| 5,237,157 | 8/1993 | Kaplan | 235/375 |
| 5,276,311 | 1/1994 | Hennige | 235/380 |
| 5,310,997 | 5/1994 | Roach et al. | 235/375 |

FOREIGN PATENT DOCUMENTS

| | | | |
|---|---|---|---|
| 0385290 | 9/1990 | European Pat. Off. | 235/380 |
| 3248290 | 2/1990 | Japan | 235/380 |

OTHER PUBLICATIONS

*Patent Abstracts of Japan*, vol. 016, No. 211 (P–1355), May 19, 1992 & JP-A-04-037975 (Dainippon Printing Co., Ltd.) Feb. 7, 1992.

Primary Examiner—John Shepperd
Assistant Examiner—Thien Minh Le
Attorney, Agent, or Firm—Staas & Halsey

[57] ABSTRACT

A processing system for processing information in a card having a plurality of functions, comprising a reading unit for reading information stored in a card therefrom, a plurality of processing units, each of which corresponds to one of the plurality of functions of the card, for processing the information read out by the reading unit in accordance with the respective functions, and an interlocking processing unit for interlocking at least two processing units which are included in the plurality of processing units when a card having a plurality of functions is supplied to the processing system.

13 Claims, 16 Drawing Sheets

FIG. 4A

| ISSUED AMOUNT | BALANCE | UPDATING DATE | MEMBER'S NO. | . . . . |
|---|---|---|---|---|

FIG. 4B

| TOTAL SERVICE POINT | BIRTHDAY | SEX | MEMBER'S NO. | . . . . |
|---|---|---|---|---|

FIG. 5A

```
1  PREPAID
2
3  TOTAL              1000 YEN
4  BALANCE            2600 YEN
5  POINT            250 POINTS
6
7
```

FIG. 5B

```
TOTAL     ¥1000
BALANCE   ¥2600
```

FIG. 6A

```
1234        10:31  93.06.09
            PREPAID

BUYING              ¥1000
PREVIOUS            ¥2600
BALANCE
POINT               250

BALANCE             ¥1600
```

FIG. 6B

```
1234        10:31  93.06.09
            PREPAID

BUYING              ¥1000
PREVIOUS            ¥2600
BALANCE
POINT               250

****  ERROR  ****
```

FIG. 11

| ITEM | DATA |
|---|---|
| IDENTIFIER | 01 |
| COMPANY PRINTING DATA | XX CREDIT |
| GROUP NO. | 01 |
| COMPANY CODE | 1694222 |
| PAYMENT PLAN SELECTING INFORMATION | 03010101 |
| FLAG | 87 |
| MANUAL INPUT Y/N | 00 |
| PASSWORD CHECKING FLAG | 0000 |
| OFF LINE LIMIT | 0050 |
| MEMBER'S NO. PRINTING RANGE | 01190116 |
| LOCAL PRINTING | 07 |
| INTERLOCKING FLAG | 01 |

FIG. 12

| STARTING CODE | MEMBER'S NO | SEPARATOR | DUE DATE | SEPARATOR | PASSWORD | INTERLOCKING FLAG | FREE | END CODE | EXAMINATION CODE |
|---|---|---|---|---|---|---|---|---|---|

FIG. 16

| ITEM | DATA |
| --- | --- |
| IDENTIFIER | 01 |
| COMPANY PRINTING DATA | XX CREDIT |
| GROUP NO. | 01 |
| COMPANY CODE | 1694222 |
| PAYMENT PLAN SELECTING INFORMATION | 03010101 |
| FLAG | 87 |
| MANUAL INPUT Y/N | 00 |
| PASSWORD CHECKING FLAG | 0000 |
| OFF LINE LIMIT | 0050 |
| MEMBER'S NO. PRINTING RANGE | 01190116 |
| LOCAL PRINTING | 07 |
| INTERLOCKING FLAG | 01 |
| POINT GRANTING RATE | 05 |

PROCESSING SYSTEM FOR PROCESSING INFORMATION IN CARD HAVING PLURALITY OF FUNCTIONS

BACKGROUND OF THE INVENTION (1) Field of the Invention

The present invention generally relates to a processing system for processing information stored in cards, such as credit cards, prepaid cards and cards for stamp services, each of which having a plurality of functions.

(2) Description of the Related Art

Recently, various types of cards, such as credit cards and prepaid cards, have become popular. These types of cards are issued by various issuers, such as department stores, large scale stores, credit companies in concert with stores, specialty stores, small scale stores, chains and groups.

To improve services for users of cards and to accelerate usage of cards, cards which can be used in transaction fields different from each other and cards having functions corresponding to additional services have also become proposed. A point service has been popular, in which service points corresponding to purchase amounts in shopping and frequency of shopping are granted to a customer, and the customer can receive a bonus comparable to the total service points granted to him/her. Credit cards may have an additional function corresponding, for example, to this point service.

A card having a plurality of functions must store information corresponding to the plurality of functions to be executed. Thus, the quantity of information in each card is increased and the contents of the information becomes complex. If the information in the card is corrupted, the user of the card may suffer great losses. To reduce the risk of corruption of the information in the card, it is preferable that the number of operations required to process the information in the card is small and that the operations themselves are simple.

In a case where information stored in a card having a plurality of functions is processed, in general, different processing devices (e.g. bank cash machines and store teller units) process information for different functions. If one processing device has an error caused by, for example, an error input, malfunction of the device, or power supply interruption, there is an apprehension that not only information to be processed by the processing device having the error is corrupted but also that information related to other functions of the card may be corrupted.

In addition, even if the information for a plurality of functions in a card can be processed by one processing device, the card is ejected from the processing device after processing for a function that has been completed, and the card must be inserted into the processing device again to process the information for another function of the card. That is, in a case where information for a plurality of functions of the card is processed, processes for the plurality of functions can not be continuously carried out, and insertion and ejection of the card must be performed for each process.

It is desired, in the point service, that a granting rate at which the service points are granted to a user be changed, for example, in accordance with a payment plan, such as a lump-sum payment plan, a partial payment plan or a revolving payment plan. In this case, a process for the point service and a process for changing the granting rate of the service point are separately carried out. Thus, operations for changing the granting rate of the service points, under a condition in which the process for the point service is being performed, are complex.

SUMMARY OF THE INVENTION

Accordingly, a general object of the present invention is to provide a novel and useful processing system for processing information in a card having a plurality of functions in which system the disadvantages of the aforementioned prior art are eliminated.

A specific object of the present invention is to provide a processing system which can compactly and rapidly process information for a plurality of functions provided to a card.

Another object of the present invention is to provide a processing system in which the probability of corruption of information for a plurality of functions provided to a card can be reduced.

The above objects of the present invention are achieved by a processing system for processing information in a card having a plurality of functions, comprising: reading means for reading information stored in a card; a plurality of means, each of which corresponds to one of the plurality of functions of the card, for processing the information read out by the reading means in accordance with the respective functions; and interlocking means for interlocking at least two means which are included in the plurality of means when a card having a plurality of functions is supplied to the processing system.

According to the present invention, since two processes for functions of the card are interlocked with each other, the information for the two functions can be compactly and rapidly processed. In addition, since the two processes are interlocked, the number of operations required for the processing which uses the card is reduced. As a result, the probability of damage to information in the card can be reduced.

Additional objects, features and advantages of the present invention will become apparent from the following detailed description when read in conjunction with the accompanying drawings.

BRIEF DESCRIPTION OF THE DRAWINGS

FIGS. 4A and 4B are diagrams illustrating examples of structures of information storage areas in a card.

FIGS. 5A and 5B are diagrams illustrating examples of information displayed by a display unit.

FIGS. 6A and 6B are diagrams illustrating examples of receipts issued by the card processing terminal device.

FIG. 11 is a diagram illustrating an example of a credit company table.

FIG. 12 is a diagram illustrating an example of a format of card data.

FIG. 16 is a diagram illustrating another embodiment of the credit company table.

DESCRIPTION OF THE PREFERRED EMBODIMENTS

A description will now be given, with reference to FIG. 1, of an essential constitution of a card processing terminal device according to an embodiment of the present invention.

Figure 1:
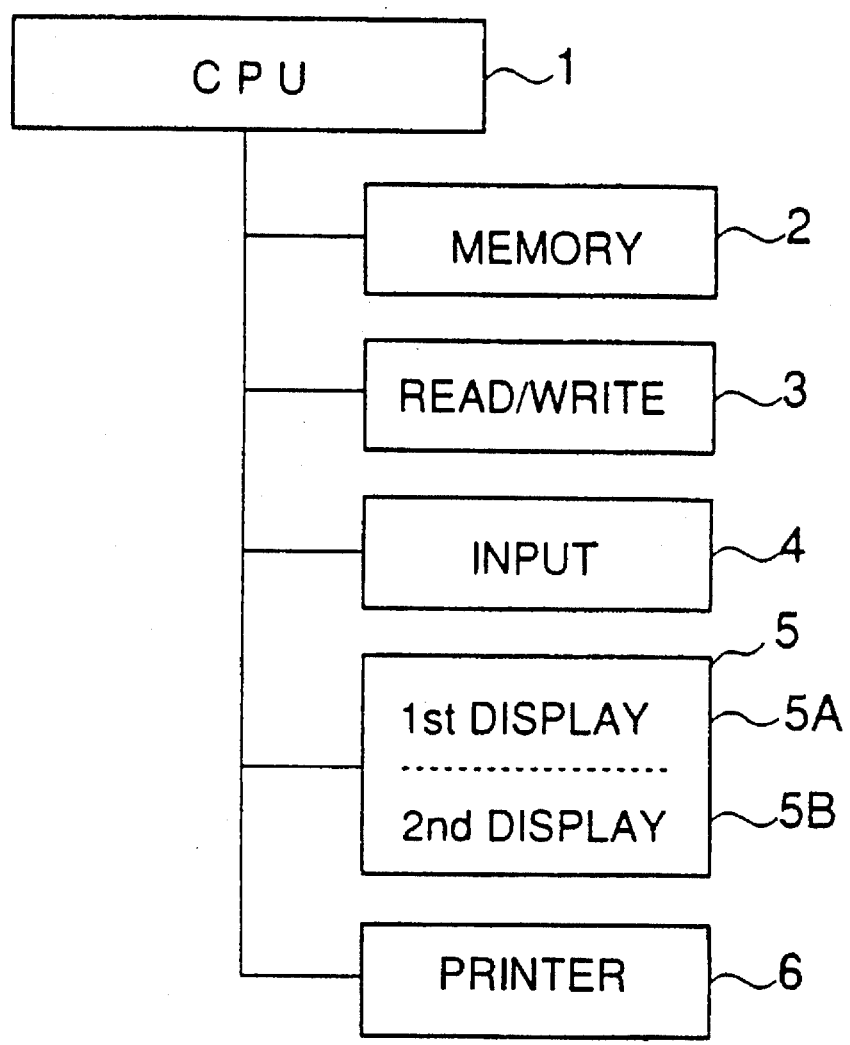
FIG. 1 is a block diagram illustrating an essential part of a card processing terminal device according to an embodiment of the present invention.

Referring to FIG. 1, a card processing terminal device has a CPU (Central Processing Unit) 1, a memory unit 2, a read/write unit 3, an input unit 4, a display unit 5 and a printer unit 6 all of which are coupled to each other by a bus. The CPU 1 controls the peripheral units so that various processes including processes corresponding to functions of a card are performed. The memory unit 2 has a ROM (or a non-volatile memory) for storing programs and a RAM for storing various data items. The memory unit 2 is provided with data for a function identified by a user and is provided with data required for processes corresponding to other functions. The read/write unit 3 reads out information from a card loaded therein and writes information processed by the CPU 1 onto the card. In general, the read/write operations are magnetically performed. The read/write unit 3 may also process information in a magneto-optic card using a laser beam. The read/write unit 3 may have a punching unit for punching a hole or a marking unit for marking a mark, which hole or mark indicates the amount used on the card.

The input unit 4 is used by an operator to input information (e.g. operating conditions and instructions). The input unit 4 may have a keyboard and a bar-code reader. The display unit 5 has a first screen area 5A for displaying information (e.g. messages and operating information) to an operator and a second screen area 5B for displaying information (e.g. messages and transaction information) to a user of the card. The display unit 5 may have a CRT or an LCD (Liquid Crystal Display). The printer unit 6 issues a receipt on which predetermined data items are printed. All or part of the data items displayed by the display unit 5 are printed on the receipt by the printer unit 6.

Figure 2:
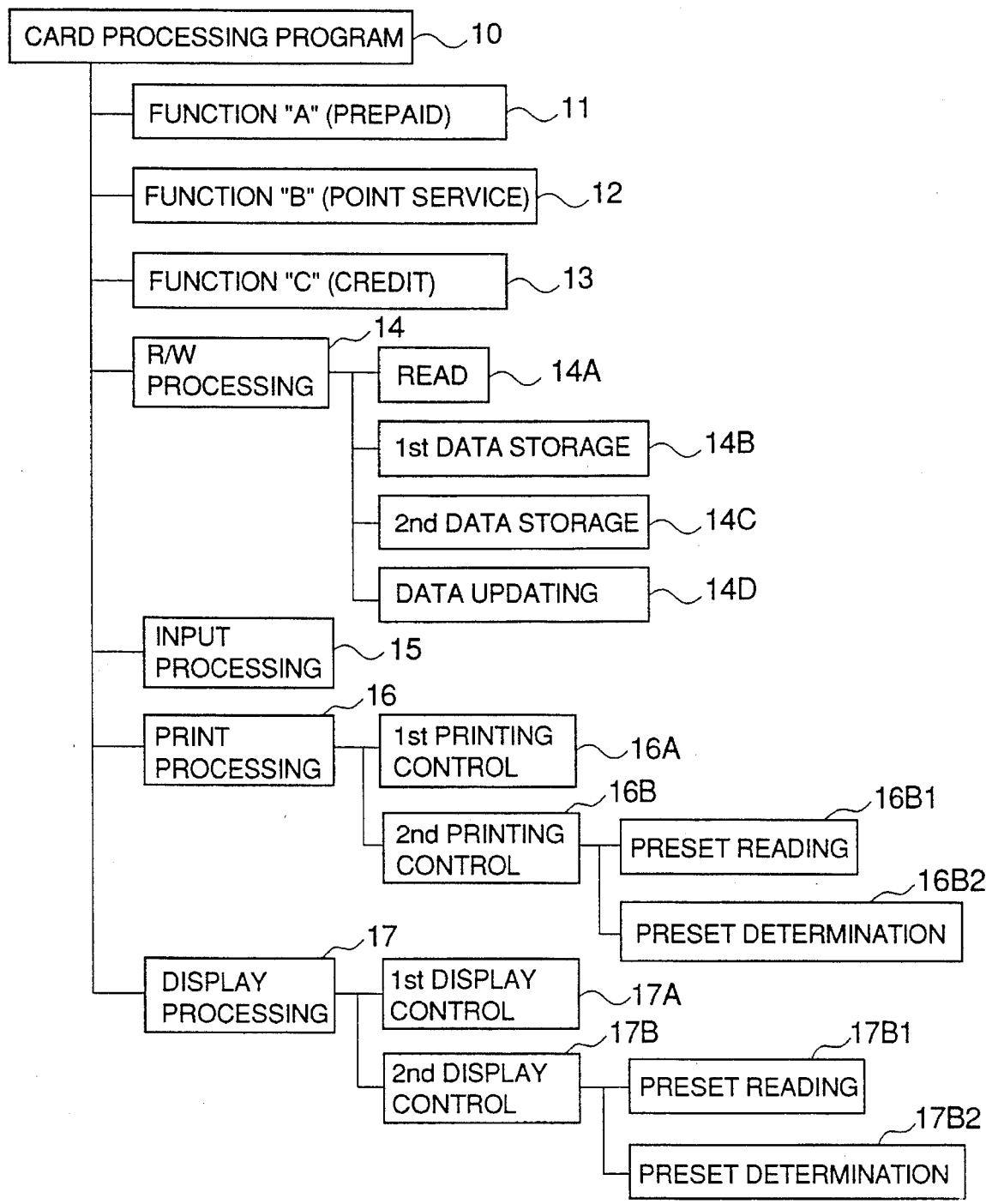
FIG. 2 is a block diagram illustrating a first embodiment of a software constitution provided in the card processing terminal device.

The software provided in the above card processing terminal device is structured as shown in FIG. 2.

Referring to FIG. 2, a card processing program 10 loaded in the card processing terminal device includes a first function block 11 corresponding to a prepaid transaction, a second function block 12 corresponding to a point service and a third function block 13 corresponding to a credit transaction. That is, in this embodiment, this card processing terminal device can process information in a card having the three functions (the prepaid transaction, the point service and the credit transaction). The card processing program 10 also includes a read/write processing block 14, an input processing block 15, a print processing block 16 and a display processing block 17. The read/write processing block 14 is formed of a data reading block 14A, a first data storage block 14B, a second data storage block 14C and a data updating block 14D. The data reading block 14A reads out data from a card loaded in the read/write unit 3. The first data storage block 14B stores data for a function selected from among the three functions stored in the memory unit 2. The second data storage block 14C stores data for the other functions stored in the memory unit 2. The data updating block 14D updates the data in the card in accordance with the result of a transaction corresponding to the selected function. Information identifying the data to be processed by the second data storage block 14C can be preset by the input unit 4. The second data storage block 14C is not included in a processing program of the conventional card processing terminal unit. If a function i.e., (the prepaid transaction) is selected, the first function block 11 is activated and data items for the selected function are stored in the memory unit 2 by the first data storage block 14B. Data items for the other functions (the point service and the credit transaction) are stored in the memory unit 2 by the second data storage block 14C.

The input processing block 15 performs input processing of data supplied from the input unit 4. The print processing block 16 makes the printer unit 6 print information on a receipt and issues it. The print processing block 16 is formed of a first processing block 16A for printing data items regarding the selected function and a second processing block 16B for printing data items regarding the other functions. The second processing block 16B has a preset reading block 16B1 for reading a preset file in which data items to be printed and/or displayed are preset and a preset determination block 16B2 for determining whether information is preset in the preset file. The second processing block 16B is not included in the processing program of the conventional card processing terminal device. The display processing block 17 makes the display unit 5 display various information. The display processing block 17 also has a first processing block 17A for displaying information data items regarding the selected function and a second processing block 17B for displaying data items regarding the other functions. The second processing block 17B is formed of a preset reading block 17A and a preset determination block in the same manner as the second processing block 16B of the print processing block 16. The second processing block 17B of the display processing block 17 is also not included in the processing program of the conventional card processing terminal device. The contents of the preset file can be printed by the printer unit 6 and displayed by the display unit 5.

Figure 3:
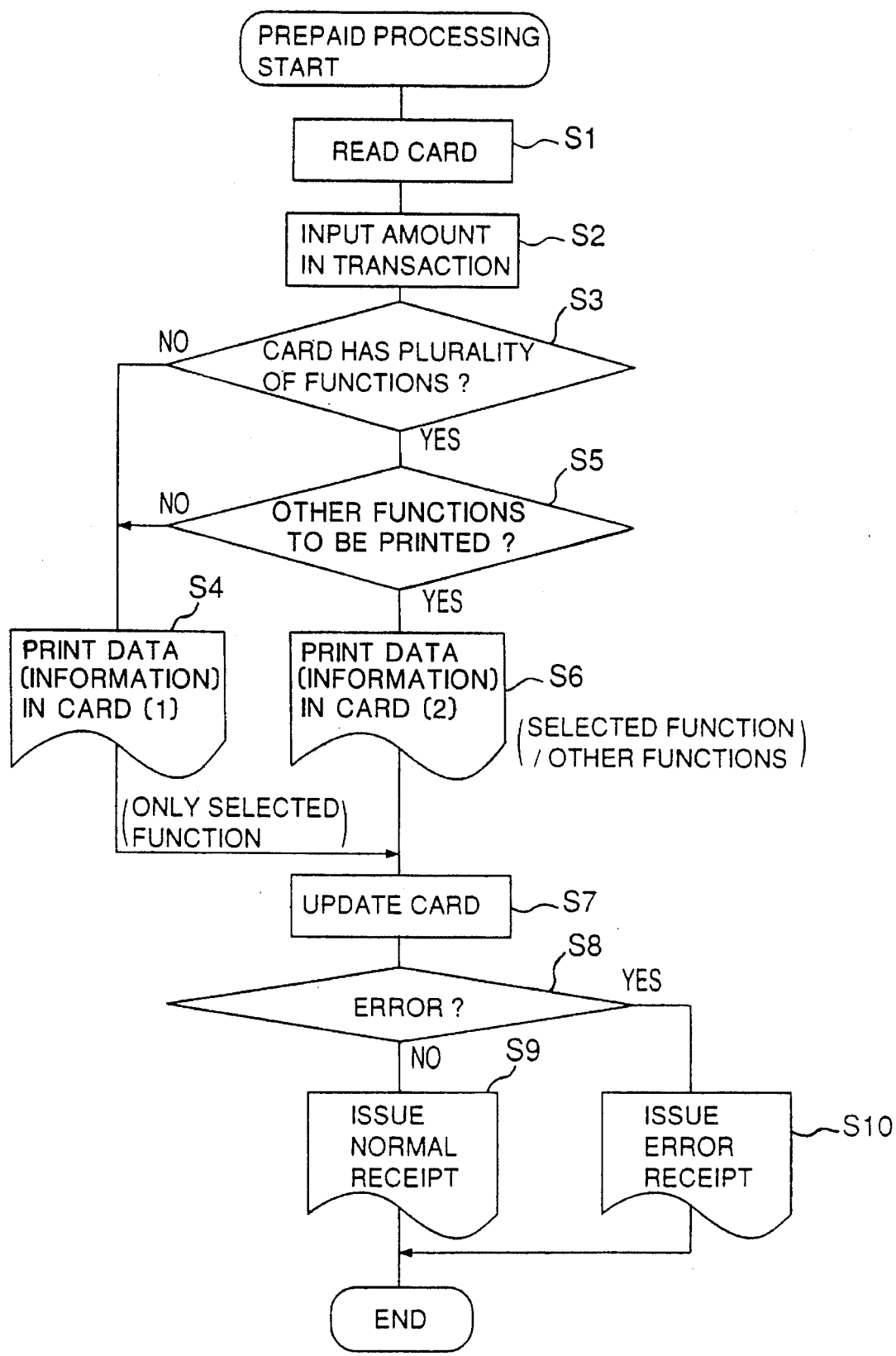
FIG. 3 is a flow chart illustrating a process performed in accordance with the software shown in FIG. 2.

If a function corresponding to a prepaid transaction is selected by an input operation in the input unit 4, a process is performed, for example, in accordance with a flow chart shown in FIG. 3.

When a card is loaded in the read/write unit 3, data stored in the card is read out and is stored in the memory unit (step S1). The data stored in the card includes, for example, a user ID, a prepaid balance, a cashing service limit, a validity term date, and codes identifying systems in which the card can be used. An amount of a transaction is then input by an operator from the input unit 4 (step S2). It is determined, with reference to the information read out from the card and a card issuing company table, whether or not the card has a plurality of functions (step S3). If the card has only a single function corresponding to the prepaid transaction, the data in the card is printed on a receipt and the receipt is issued (step S4).

On the other hand, if it is determined, in step S3, that the card has a plurality of functions, it is further determined, with reference to the preset file, whether or not data for functions other than the selected function, corresponding to the prepaid transaction, is to be printed (step S5). If information identifying the data for other functions is not preset in the preset file, only the data for the selected function is printed on a receipt and the receipt is issued (step S4). If information identifying the data for other functions is preset in the preset file, the data for the other functions is printed on the receipt along with the data for the selected function in accordance with the information preset in the preset file (step S6). In steps S4 and S6, the data printed on the receipt is displayed on the display unit 5.

After the printed receipt (indicating the preset data in the card) is issued, an updating process is performed in step S7. In the updating process, the amount in the transaction is subtracted from the prepaid balance so that the balance stored in the card is updated. If the card has another function corresponding to the point service, service points granted in the current prepaid transaction are added to a service point total stored in the card so that the service point total is updated. After this, it is determined whether or not an error has occurred in an operation in which the information stored in the card is updated. If no error has occurred, a normal receipt is issued by the card processing terminal device (step S9). On the other hand, if an error has occurred, an error receipt is issued (step S10).

An information storage area of the card having a function corresponding to the prepaid transaction and a function corresponding to the point service is divided into a prepaid information area as shown in FIG. 4A and a point service information area as shown in FIG. 4B. The prepaid information area shown in FIG. 4A includes issued amount, usable balance, updating date, member's number and the like. The point service information area shown in FIG. 4B includes current service point total, birthday, sex, member's number and the like.

The information in the card is displayed, in step S6 before the updating process in step S7, for example, as shown in FIGS. 5A and 5B. FIG. 5A shows information displayed on the first screen area 5A for the operator, and FIG. 5B shows information displayed on the second screen area 5B for the user of the card. In this example, information (TRANSACTION AMOUNT: 1,000 YEN and BALANCE: 2,600 YEN) regarding the prepaid transaction, which is selected from among the functions of the card, and information (TOTAL SERVICE POINTS: 250 points) regarding the point service, corresponding to another function of the card, are displayed on the first screen area 5A. On the second screen area 5B for the user of the card, only the information (TRANSACTION AMOUNT: 1,000 YEN and BALANCE: 2,600 YEN) regarding the prepaid transaction is displayed.

FIG. 6A shows the normal receipt issued by the card processing terminal device in step S9 of the above process. On the normal receipt shown in FIG. 6A, a transaction amount (1,000 yen) in the current prepaid transaction, a previous balance (2,600 yen), and an updated balance (1,600 yen) obtained by subtracting the transaction amount from the previous balance (2,600−1,000=1,600) are printed. A service point total (250 points) which is obtained by adding service points granted in the current transaction to the previous service point total is also printed on the normal receipt.

FIG. 6B shows the error receipt issued by the card processing terminal device in step S10 of the above process. If an error occurs in the updating process (step S7), the updated balance is not obtained. In this case, an error message "WRITING ERROR" is printed on the error receipt along with the transaction amount (1,000 yen), the previous balance (2,600 yen) and the total service point (250 points) as shown in FIG. 6B.

When an error occurs in the updating process, the information in the card is damaged. Thus, when the error receipt is issued, the user of the card brings the card and the error receipt to a service counter, and a procedure for reissuing a card and repaying the present balance in the card are performed at the service counter, based on the information printed on the error receipt.

Figure 7:
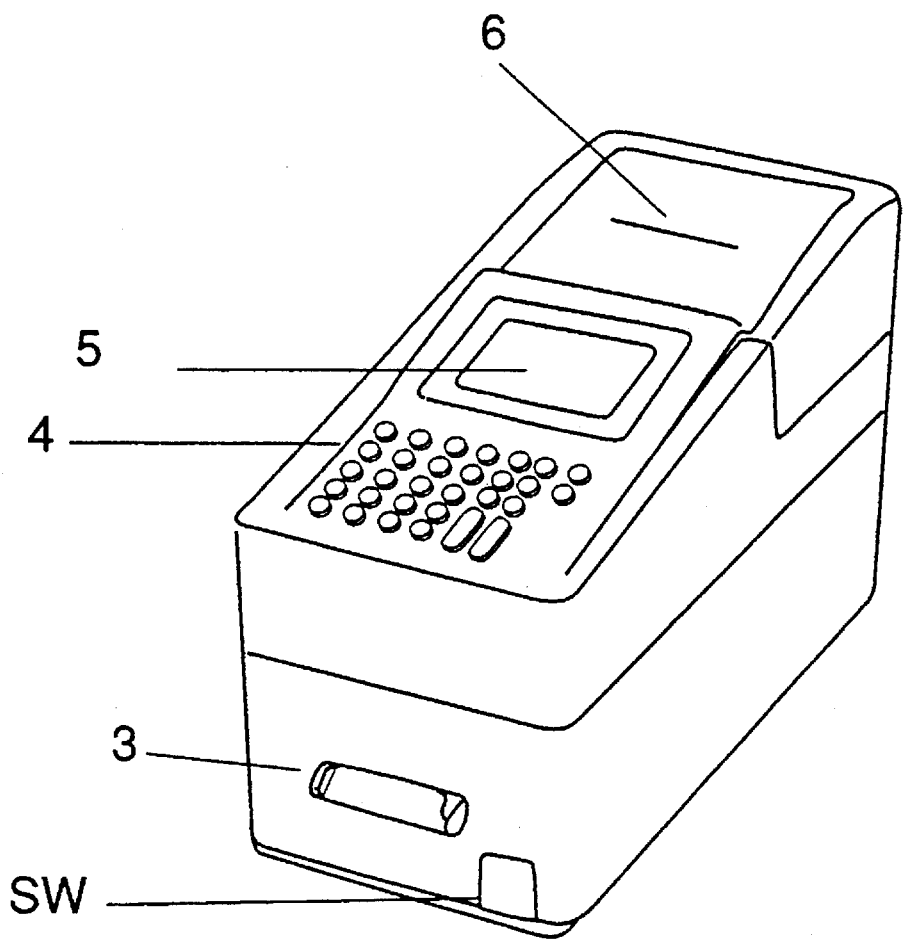
FIG. 7 is a perspective view illustrating the card processing terminal device.

FIG. 7 shows an exterior view of the card processing terminal device. In FIG. 7, those parts which are the same as those shown in FIG. 1 are given the same reference numbers. In a transaction with a card, the following operations are carried out.

A power switch SW is turned on, and a card is inserted into an inlet of the read/write unit 3. The CPU 1 of this device and a host computer (not shown) recognize the card, and predetermined messages are displayed by the display unit 5. After this, the operator inputs required data by means of the input unit 4. The input data and results obtained by the process as described above are displayed by the display unit 5. The results are further printed on a receipt by the printer unit 6 and the receipt is issued from this card processing terminal device.

If an error, caused by physical deformation of the card, power supply trouble or the like, occurs while the above process is being performed, the information for the selected function and the information for the other functions are damaged. In this case, the information for the selected function and the information preset in the preset file are printed and/or displayed. Thus, the information in the card can be restored based on the information printed on receipts issued in steps S6 and/or step S10.

Figure 8:
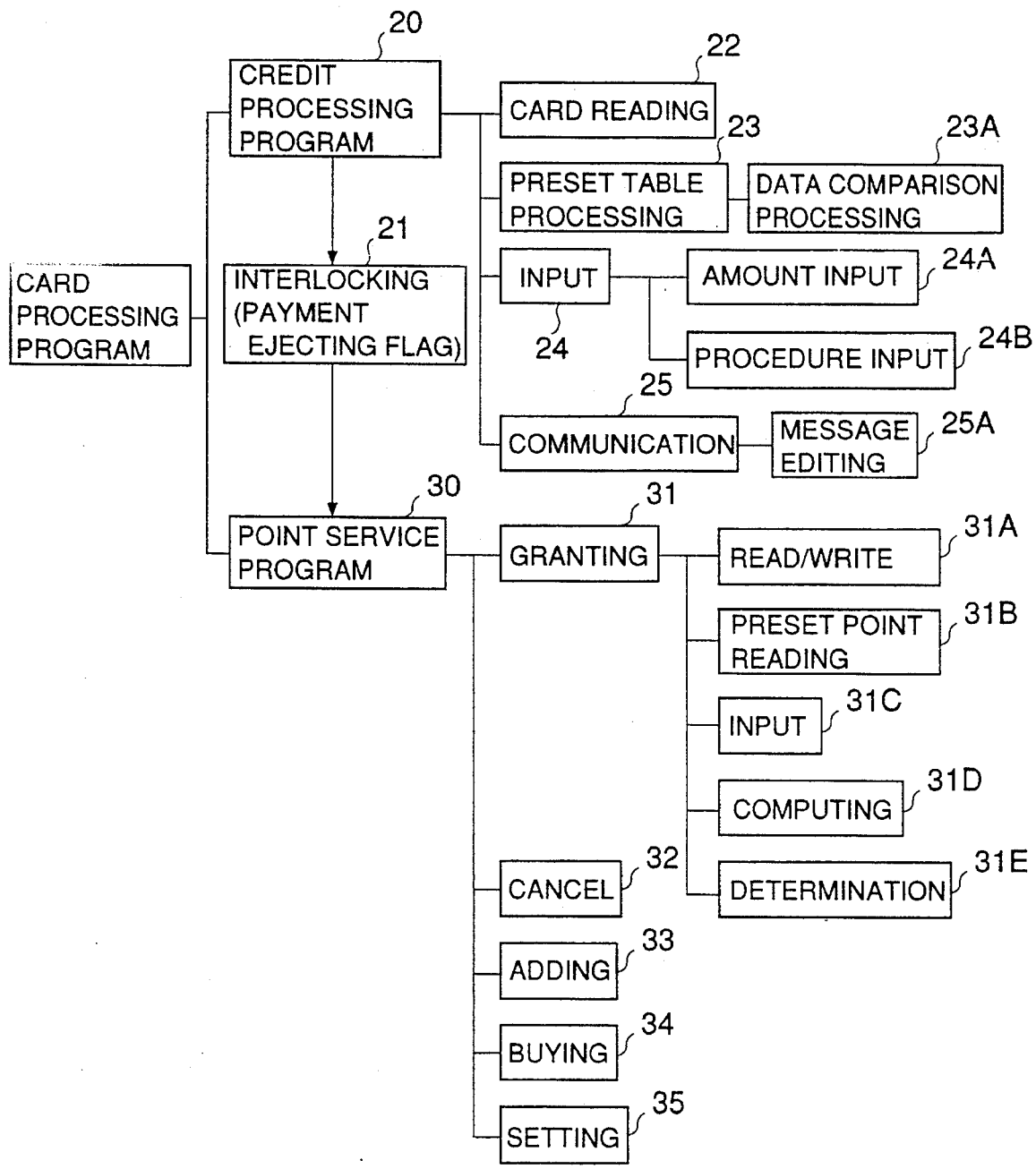
FIG. 8 is a block diagram illustrating a second embodiment of a software constitution provided in the card processing terminal device.

Another example of the software provided in the card processing terminal device is shown in FIG. 8. In this example, a process for the credit transaction and a process for the point service are performed.

Referring to FIG. 8, the card processing program includes a credit transaction processing program 20 and a point service processing program 30. The process for the credit transaction is performed in accordance with the credit transaction processing program 20. The credit transaction processing program includes a read processing block 22, a preset table processing block 23, an input processing block 24 and a communication processing block 25. The read processing block 22 reads out information from the card loaded in the read/write unit 3. The table processing block 23 has a data comparison processing block 23A, and information read out from a table is compared with data in the card. The input processing block 24 includes an amount input processing block 24A for inputting an amount in a transaction and a procedure input processing block 24B for inputting various instructions. The communication processing block 25 communicates with a host computer (not shown) so that information is transmitted to the host computer and this card processing terminal device receives information from the host computer. The communication block 25 includes a message editing block 25A.

The point service program 30 includes a granting processing block 31, a cancel processing block 32, an addition processing block 33, a buying processing block 34 and a setting processing block 35. The granting processing block 31 grants service points in accordance with the amount of a transaction. The granting processing block 31 includes a read/write processing block 31A, a preset point reading block 31B, an input processing block 31C, a computing block 31D and a determination block 31E. The read/write processing block 31A reads out information from the card and writes information in the card. The preset point reading block 31B reads the service point total which has been previously set in the memory unit 2. The determination processing block 31E determines which function among from a plurality of functions activates the service point processing program 30.

The card processing program also includes an interlocking processing block 21. The interlocking processing block 21 interlocks the point service processing program 30 with the credit transaction processing program 20. That is, if a flag, indicating that the point service is interlocked with the credit transaction, is activated in the information read out from the card, the interlocking processing block 21 activates the point service processing program 30 after the process for the credit transaction is completed and required data obtained in the credit transaction is supplied to the service point processing program 30.

Figure 9:
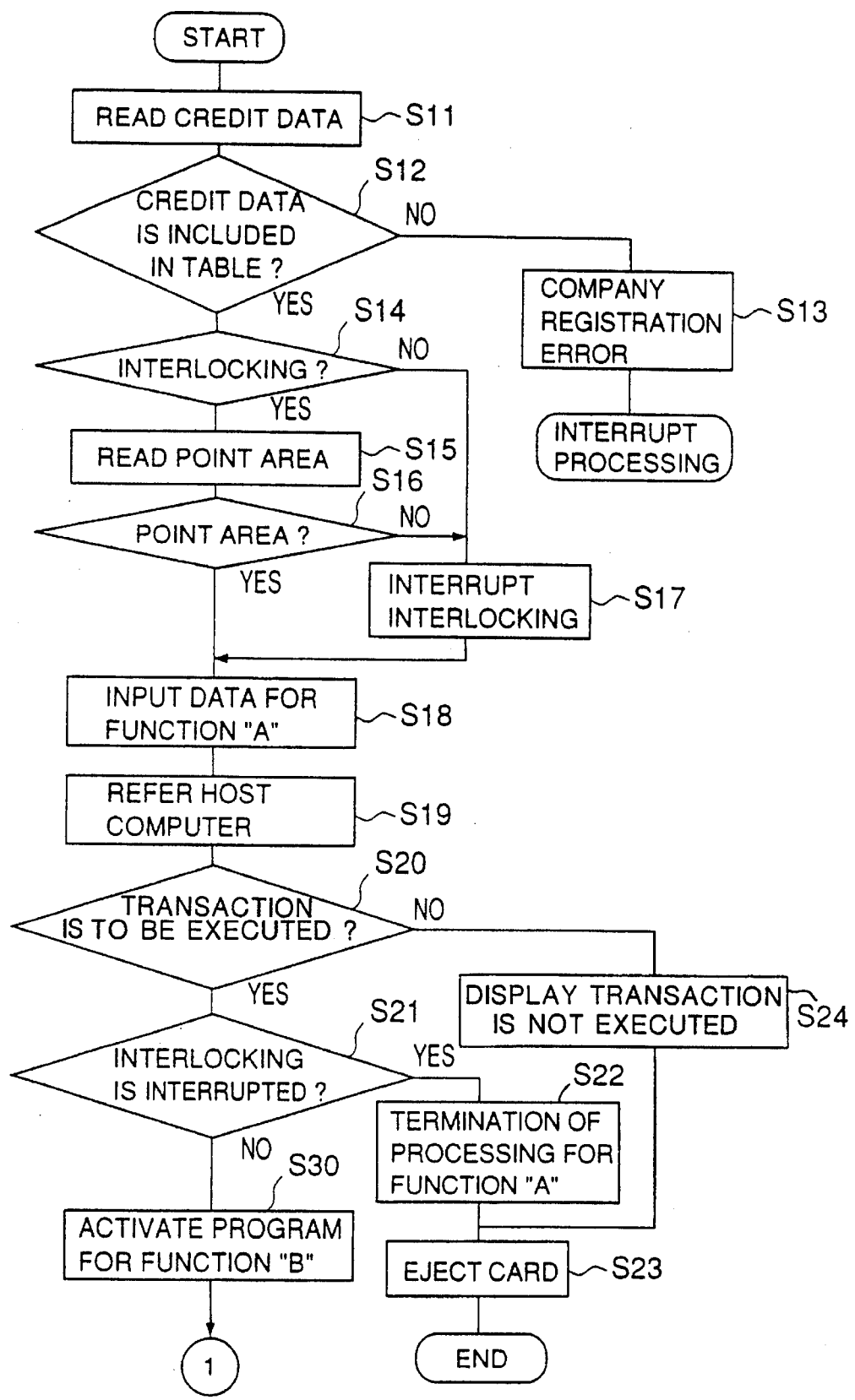
FIGS. 9 and 10 are flow charts illustrating a process performed in accordance with the software shown in FIG. 8.
Figure 10:
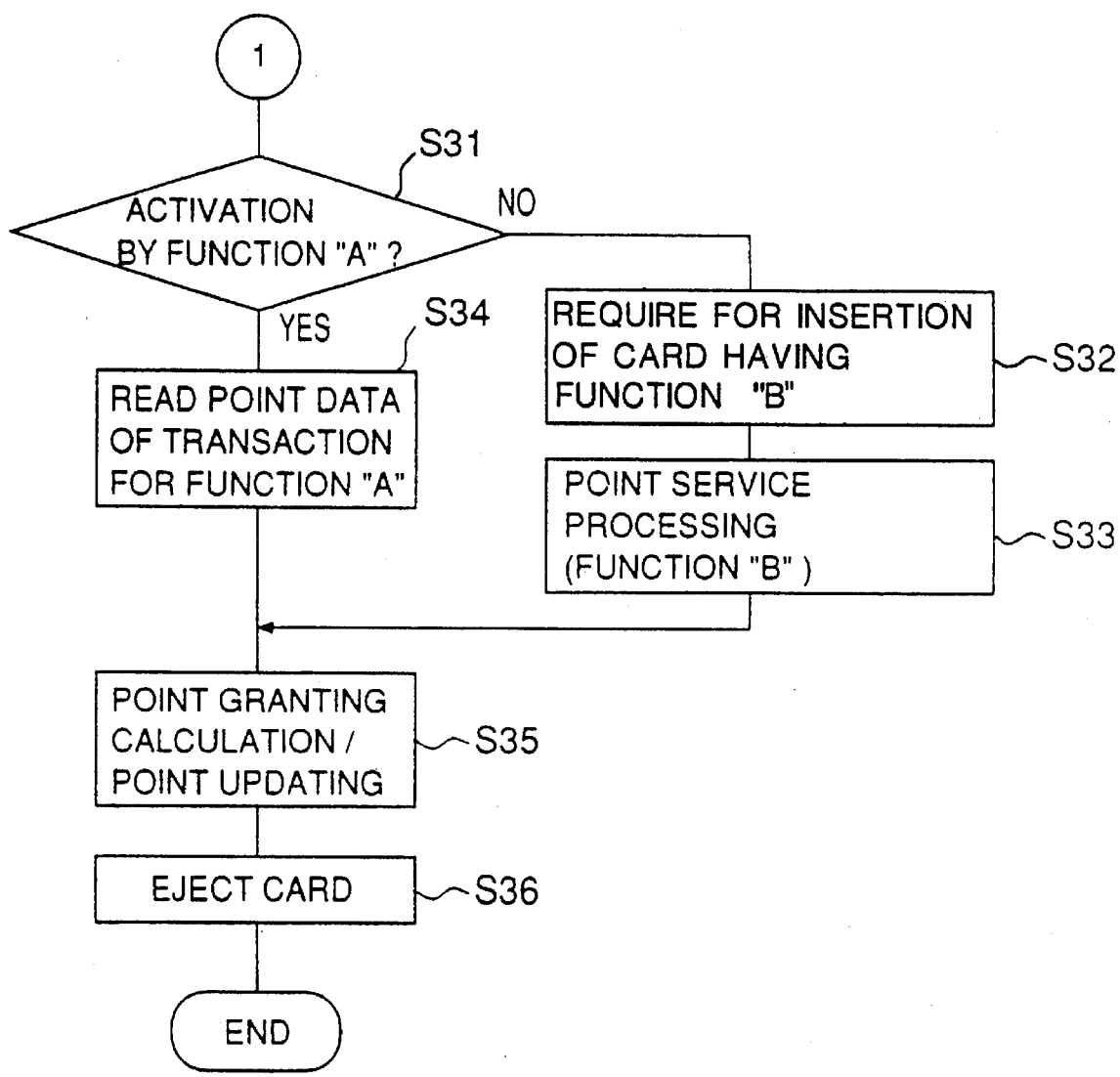

In a case where processes for the credit transaction and the point service can be carried out with a single card, the processes are performed in accordance with the flow chart shown in FIGS. 9 and 10.

Referring to FIG. 9, when a card is inserted into the card processing terminal device, credit card data stored in the card is read out (step S11), and it is determined whether or not the credit card data (having a format as shown in FIG. 12) is included in the data of the table as shown in FIG. 11 (step S12). If the credit card data is not included in the data of the table (indicating a member's number, identifying an issuing company, a password number and the like), the card processing terminal device recognizes that there is an error in the credit card data (step S13), and the process is interrupted. On the other hand, if the credit card data is included in the data of the table, it is determined whether or not a plurality of processes corresponding to the functions of the card can be interlocked with each other (step S14). If the plurality of processes can be interlocked, data is read out from a third track of the card which track is assigned to a point data area by JIS-1 (Japan Industry Standard) (step S15). It is then determined whether or not there is a point data area in the card (step S16).

If it is determined, in step S14, that the plurality of processes cannot be interlocked or it is determined, in step S16, that there is no point area in the card, a flag for controlling the interlocking of the processes is deactivated (step S17). This flag is referred to as an interlocking flag. After it is determined, in step S16, that the point data area exists in the card or the flag is inactive (step S17) the data for the credit transaction (a function "A") is input to the card processing terminal device (step S18). The data includes a merchandise classification, a transaction amount, tax, charge, a payment plan and the like. The card processing terminal device refers to the host computer for the input data (step S19). In reference to the host computer, a valid date of the card, a password number and the like are checked. Based upon results obtained by reference to the host computer, it is determined whether or not this credit transaction is to be executed (step S20). If it is determined that the transaction is to be executed, it is further determined whether or not the interlocking flag has been activated (step S21). In a case where the interlocking flag has not been activated, (i.e., interlocking is not interrupted) at step S21 termination of processing of the credit transaction (the function "A") is performed (step S22). The card is then ejected from the card processing terminal device (step S23), and the process for the credit transaction is completed.

If it is determined that this credit transaction is not to be executed (step S20), a message indicating that this credit transaction is not to be executed is displayed by the display unit 5 (step S24), and the card is ejected (step S23).

On the other hand, in a case where the interlocking flag has been activated, (and thus interlocking is not interrupted) at step S21 the point service processing program 30 is activated in accordance with an instruction from the interlocking processing block 21 (step S30). As a result, the process for the point service (the function "B") starts. The process for the point service is performed in accordance with the flow chart shown in FIG. 10. Referring to FIG. 10, it is determined whether or not the activation of the process for the point service was caused by the credit transaction (the function "A") (step S31). If the activation of the process was caused by the credit transaction service, point data corresponding to the credit transaction amount described above is obtained (step S34). After this, a process for granting service points corresponding to the point data and a process for updating a service point total stored in the card according to the granted service point are performed (step S35). After the updating of the service point total is completed, the card is ejected from the card processing terminal device (step S36), and the process for the point service (the function "B") is completed.

On the other hand, when it is determined, in step S31, that the activation of the process is not caused by the credit transaction, the card processing terminal device recognizes that the process for the point service has been separately activated. Thus, a message requesting insertion of a card for the point service is displayed by the display unit 5 (step S32). After the card is inserted into the card processing terminal device, a process for obtaining point data corresponding to a transaction amount is performed (step S33).

The above processes are performed by the card processing terminal device in this embodiment. However, the host computer can carry out the processes. In this case, the data obtained by the card processing terminal device is included in reference messages and they are transmitted to the host computer.

FIG. 11 shows an example of the table used in step S12 of the process for the credit transaction. The table includes data used to determine whether or not the process for the credit transaction can be performed and an interlocking flag indicating whether or not a plurality of processes can be interlocked with each other. The table is provided in the host computer, and the host computer transmits the data in the table to the card processing terminal device in response to the request from the card processing terminal device.

FIG. 12 shows an example of the format of the credit card data stored in the card. The credit card data includes a starting code, a member's number, the valid date of the card, a password number, an interlocking flag, a free space, an end code and an examination code. Separators are positioned between the member's number and the valid date of the card and between the valid date of the card and the password number.

According to the above example, the process for the credit transaction (the function "A") and the process for the point service (the function "B") are interlocked with each other. That is, after the card is inserted into the card processing terminal device once, two processes are performed. Thus, the number of operations for card ejection, card insertion and data input can be reduced.

Figure 13:
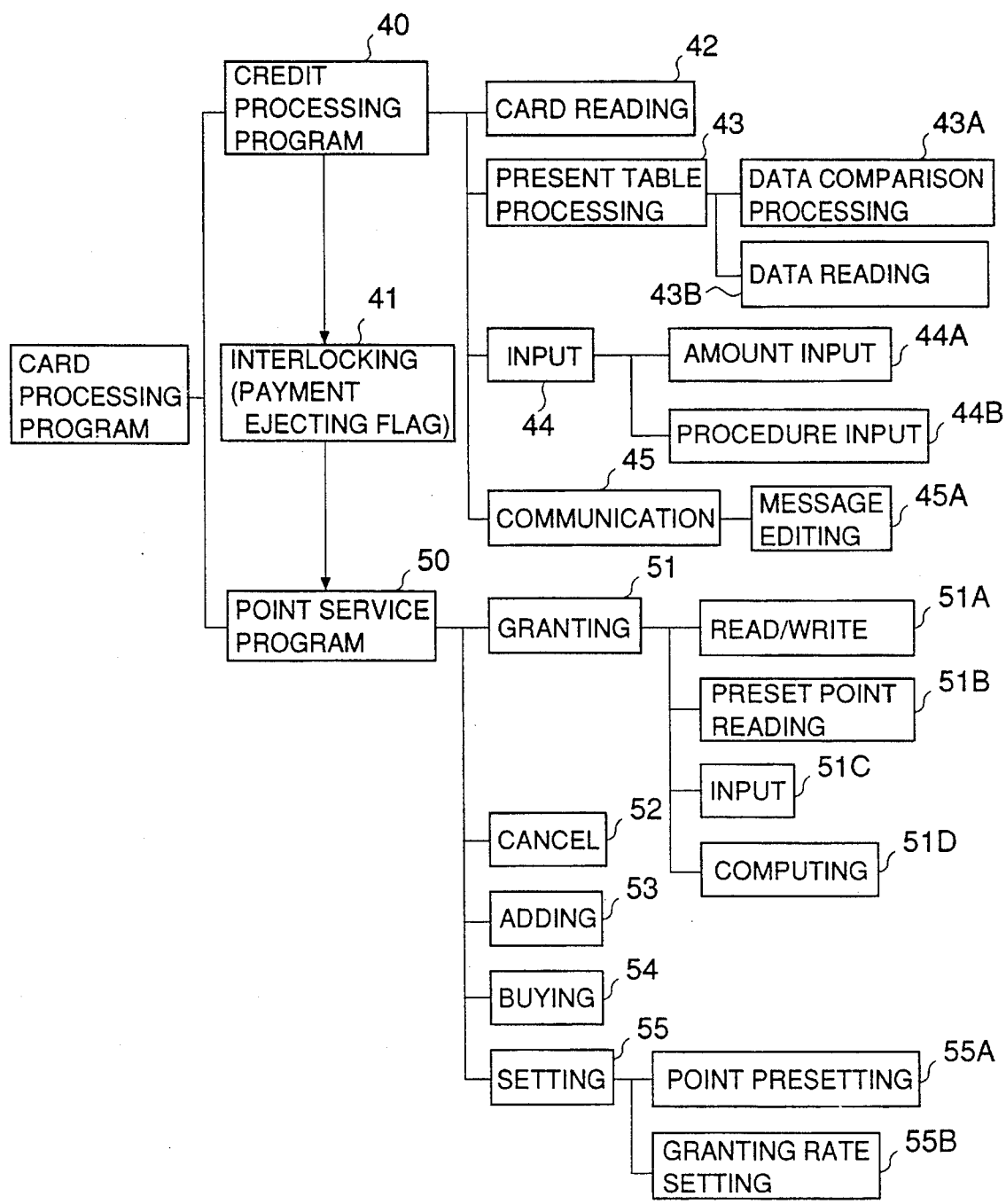
FIG. 13 is a block diagram illustrating a third embodiment of a software constitution provided in the card processing terminal device.

Another example of the software provided in the card processing terminal device is shown in FIG. 13. In this example, the granting rate of the service point can be changed in accordance with a transaction mode, a transaction company, a payment plan or the like, the granting rate corresponding to the rate of the granted service point to the transaction amount.

Referring to FIG. 13, the card processing program includes, in the same manner as that shown in FIG. 8, a credit transaction processing program 40, a point service processing program 50 and an interlocking processing block 41. The credit transaction processing program 42 includes a read processing block 42, a table processing block 43 having a data comparison processing block 43A, an input processing block 44 having an amount input processing block 44A and a procedure input processing block 44B and a communication processing block 45 having a message editing block 45A. The table processing block 43 also includes a data taking processing block 43B. The point service processing program 50 includes, in the same manner as that shown in FIG. 8, a granting processing block 51 having a read/write processing block 51A, a preset point reading block 51B, an input processing block 51C and a computing block 31D, a cancel processing block 32, an addition processing block 33, a buying processing block 34 and a setting processing block 35. The setting processing block 35 includes a point presetting block 55A and a credit table setting block 55B.

Figure 14:
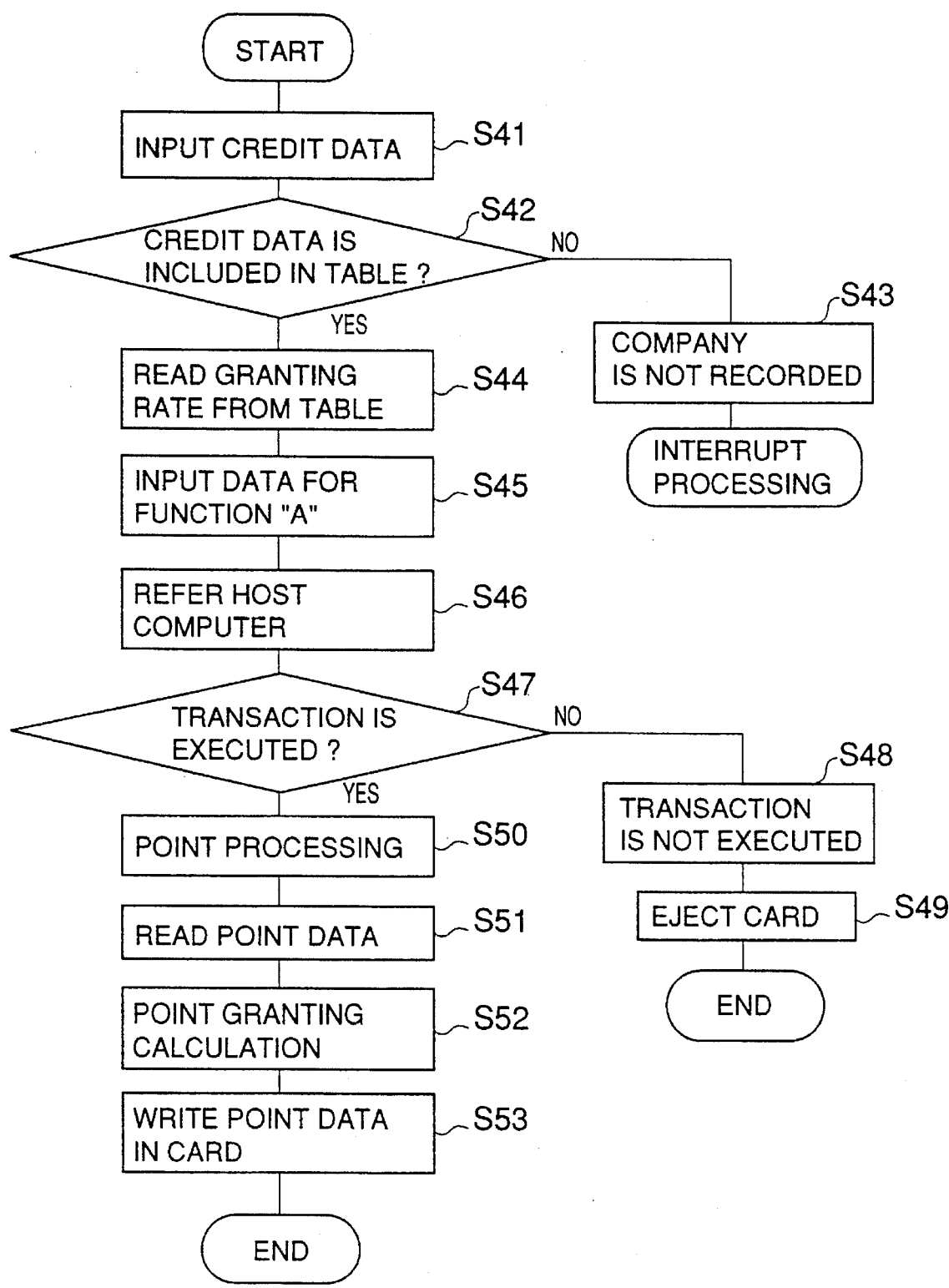
FIG. 14 is a flow chart illustrating a process performed in accordance with the software shown in FIG. 13.

The process for the credit transaction (the function "A") and the process for the point service (the function "B") are interlocked as shown in FIG. 14.

Referring to FIG. 14, when the card is inserted into the card processing terminal device, the credit data is read out from the card (step S41). It is then determined whether the credit data read out from the card is included in the data table (step S42). If a company identified by the credit data is not recorded in the data table, the process is interrupted (step S43). On the other hand, if the company identified by the credit data is included in the data table, a granting rate is read out from the data table (S44). After this, conditions for the credit transaction (the function "A") are input to the card processing terminal device (step S45). The conditions are data required for the credit transaction and include, for example, merchandise classification, a transaction amount, and a payment plan. Then, the card processing terminal device refers to the host computer for the input data (the transaction conditions) (step S46). In reference to the host computer, a valid date of the card, a password number and the like are checked. Based on results obtained by reference to the host computer, it is determined whether or not this credit transaction is to be executed (step S47). If the credit transaction is not to be executed, a message indicating that the credit transaction is not to be executed is displayed by the display unit (S48), the card is ejected from the card processing terminal device (step S49), and the process is completed.

On the other hand, if the credit transaction has been executed, a point service process is then performed (step S50). After this, service point data calculated on the basis of the amount of the credit transaction and the granting rate is obtained (step S51), a service point total is calculated (step S52), and the point total data is written in the card (step S53).

Figure 15:
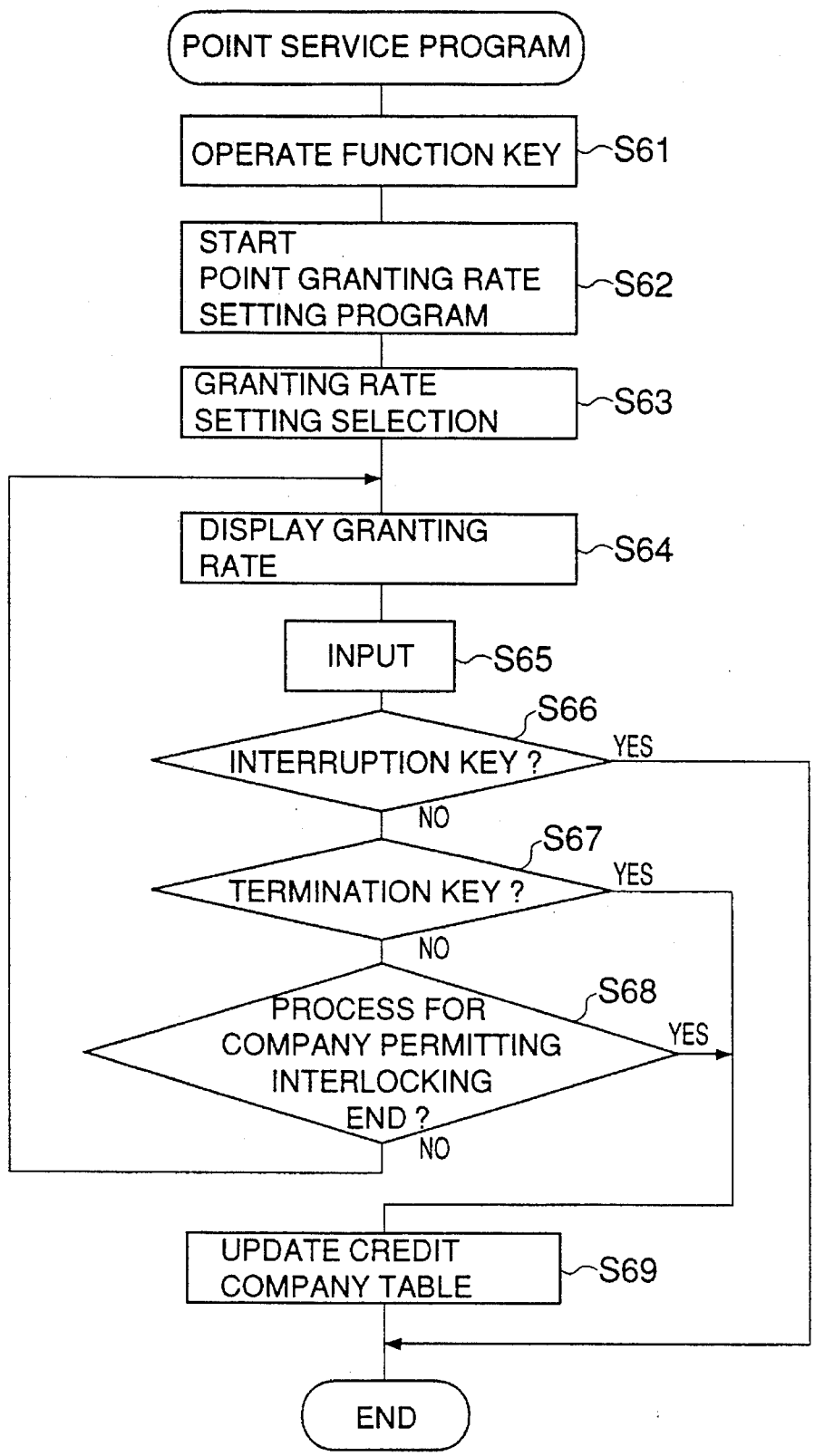
FIG. 15 is a flow chart illustrating a process for changing a granting rate at which the service points are granted.

The granting rate in the data table is updated in accordance with a flow chart shown in FIG. 15. A granting rate setting program can be activated by a function key operation while the process for the point service is being performed in accordance with the point service processing program 50.

When a predetermined function key in the input unit 4 is operated (step S61), the granting rate setting program starts (step 62) and a granting rate setting process is selected (step S63). After the granting rate setting process is selected, the current service point granting rate is displayed by the display unit 5 (step S64). With reference to the screen of the display unit 5, the operator inputs required data from the input unit 4 (step S65). The input data may depend on conditions, such as the rank of a company, merchandise classification, a transaction type, a season, a time band, a holiday, the day of the week and the like. After this, it is determined whether or not an input interruption key has been operated (step S66). If the input interruption key has not been operated yet, it is further determined whether or not a termination key has been operated (step S67). If the termination key has not been operated yet, it is determined whether or not a process for a company permitting interlocking processes has been completed (step S68). If the process for the company permitting interlocking processes has not been completed yet, the process returns to step S64. After this, steps S64–S68 are repeated until the process for the company permitting interlocking processes is completed.

If the termination key is operated, of if the process for the company permitting interlocking processes is completed, the data table is updated using the input data (step S69) and the granting rate setting process is completed. In addition, if the input interruption key is operated, the granting rate setting process is immediately terminated.

The data table (in the form of a credit company table) is, for example, formed as shown in FIG. 16. Referring to FIG. 16, an item "GRANTING RATE" has been added to those shown in FIG. 11. As a result of the granting rate setting process, the data of the item "GRANTING RATE" in the data table is updated.

In this system, standard granting points corresponding to amounts in a transaction are set, for example, at 10, 100 and the like. The actual service points granted are obtained by multiplying the standard granting points by the granting rate k ($0<k<1$). In this case, the granting rate k corresponds to a weighting factor against the standard granting point. The granting points may be changed in accordance with the transaction type (e.g. a transaction in cash or a credit transaction), merchandise (e.g. garments or precious metals) or the like. The granting rate k may be set in each card processing terminal device and for each granting company. A point value is calculated using the standard granting point and the amount of the transaction, and the points to be granted are obtained by multiplying the point value by the granting rate.

According to the above example, a point service adaptable to various conditions, such as granting company, transaction type and merchandise type can be performed.

The present invention is not limited to the aforementioned embodiments, and variations and modifications may be made without departing from the scope of the claimed invention.

What is claimed is:

1. A processing system for processing information stored in a card, comprising:

reading means for receiving a card having a plurality of functions wherein said plurality of functions comprises at least first and second functions, and for reading information stored in the received card;

determination means for making a determination, based on the information read from said received and read card, whether the received and read card has a plurality of functions which can be successively executed; and processing means, responsive to a determination from said determination means that the received and read card has a plurality of functions which can be successively executed, for sequentially performing a first process corresponding to the first function of the received and read card and a second process corresponding to the second function of the received and read card.

2. The processing system as claimed in claim 1, wherein the information read from the received and read card comprises first and second information and wherein the first information obtained in the first process corresponding to the first function of the card is used in the second process corresponding to the second function of the card.

3. The processing system as claimed in claim 1, wherein the first function, of said plurality of functions of the received and read card, corresponds to a point service in which service points corresponding to transaction amounts are granted.

4. The processing system as claimed in claim 3 wherein a granting rate is used to calculate the service points corresponding to the transaction amounts, further comprising: means for changing the grating rate.

5. A processing system for processing information stored in a card, comprising:

reading means for receiving a card having a plurality of functions, wherein said plurality of functions comprises at least first and second functions, and for reading stored information from a card having at least a first function, said stored information comprising information corresponding to the first function;

processing means, for performing a process corresponding to the first function of the received and read card in accordance with the information read from the received and read card;

determination means, for making a determination, based on the information read from the received and read card, whether the received and read card has a plurality of functions including at least a second function and information corresponding to the second function; and printing means responsive to a determination of said determination means that the received and read card has a plurality of functions, for printing information read from the received and read card corresponding to at least the second function of said plurality of functions along with the information corresponding to the first function.

6. The processing system as claimed in claim 5, wherein said printing means prints the information corresponding to the first function and the information corresponding to the second function before the process corresponding to the first function is completed.

7. A processing system for processing information stored in a card, comprising:

reading means for receiving a card having a plurality of functions, wherein said plurality of functions comprises at least a first function, and for reading the information from the card, said information comprising information corresponding to the first function read from the card;

processing means for performing a process corresponding to the first function of the card in accordance with the information corresponding to the first function read from the card;

determination means for making a determination, based on the information read from said card, whether the card has a plurality of functions including at least a second function, and for instructing the reading means to read information corresponding to the second function in response thereto; and display means, responsive to a determination from said determination means that the card has a plurality of functions, for displaying information read from the card corresponding to at least the second function along with the information read from the card corresponding to the first function.

8. The processing system as claimed in claim 7, wherein said display means displays the information corresponding to the first function and the information corresponding to the second function before the process corresponding to the first function is completed.

9. The processing system as claimed in claim 7, wherein said display means comprises a plurality of display areas.

10. The processing system as claimed in claim 9, wherein said plurality of display areas comprises a first display area and said first display area is used by a user of the card.

11. The processing system as claimed in claim 10, wherein said display areas further comprises a second display area and said second display area is used by an operator of said processing system.

12. A method for processing information stored in a card, comprising the steps of:

receiving a card having a plurality of functions wherein said plurality of functions comprises at least first and second functions;

reading stored information from the received card corresponding to the first and second functions;

determining, based on the information read from the received and read card, whether the received and read card has a plurality of functions, including the first and second functions, which can be successively executed; and performing, in succession:

a first process corresponding to the first function in accordance with the stored information read from the received and read card, and a second process corresponding to the second function of the received and read card if it is determined in the determining step that the received and read card has a plurality of functions comprising the first and second functions which can be successively executed.

13. The processing system according to claim 1 wherein the information stored in the received and read card corresponds to the plurality of functions, the reading means further comprising:

first memory means for storing information corresponding to a selected function;

second memory means for storing remaining information;

means for selecting a selected function from the first and second functions of the received and read card, thereby designating remaining information; and means for storing the selected function in the first memory means and for storing the remaining information in the second memory means.

* * * * *

UNITED STATES PATENT AND TRADEMARK OFFICE
CERTIFICATE OF CORRECTION

PATENT NO. : 5,574,269
DATED : November 12, 1996
INVENTOR(S) : Seiji Mori et al.

It is certified that error appears in the above-indentified patent and that said Letters Patent is hereby corrected as shown below:

Col. 4,     line 14, change "i.e., (the" to --(i.e., the--.

Col. 7,     line 51, after "(step S17)" insert --,--
            line 63, before "In a case" start new ¶;
            line 65, delete "not".

Col. 8,     line 8, after "activated" delete ",";
            line 9, after "S21" insert --,--.

Signed and Sealed this

Eighteenth Day of March, 1997

Attest:

BRUCE LEHMAN

*Attesting Officer*    Commissioner of Patents and Trademarks